United States Patent [19]
Kleewein et al.

[11] Patent Number: 5,903,887
[45] Date of Patent: May 11, 1999

[54] METHOD AND APPARATUS FOR CACHING RESULT SETS FROM QUERIES TO A REMOTE DATABASE IN A HETEROGENEOUS DATABASE SYSTEM

[75] Inventors: James Charles Kleewein; Eileen Tien Lin; Hemant Maheshwari; Shivakumar Venkataraman, all of San Jose, Calif.

[73] Assignee: International Business Machines Corporation, Armonk, N.Y.

[21] Appl. No.: 08/931,003

[22] Filed: Sep. 15, 1997

[51] Int. Cl.$^6$ ..................................................... G06F 17/30
[52] U.S. Cl. ...................................... 707/2; 707/3; 707/10
[58] Field of Search .................................. 707/1, 2, 3, 10, 707/104, 4–6; 395/200.3, 200.31, 800.28; 711/113, 118

[56] References Cited

U.S. PATENT DOCUMENTS 5,548,758  8/1996  Pirahesh et al. .............................. 707/3

OTHER PUBLICATIONS

IBM Technical Disclosure Bulletin, vol. 31, No. 5, Oct. 1988, pp. 301–303, "Interpretive Database Merge Join Operation".

CIKM 93, Nov. 1–5, 1993, pp. 423–438, Chun–Nan Hsu et al., "Reformulating Query Plans for Multidatabase Systems".

CIKM 94, Nov. 29–Dec. 2, 1994, pp. 433–438, Ygal Arens et al., "Intelligent Caching: Selecting, Representing, and Reusing Data in an Information Server".

*Primary Examiner*—Thomas G. Black
*Assistant Examiner*—Hosain T. Alam

[57] ABSTRACT

A method enables a data manipulation action to occur between data from a data source and data in a table in a database, where the database is remote from the data source. The method includes the steps of: determining whether data from the data source comprises unique values, and if not, enabling a caching procedure. The caching procedure obtains values from the data source and transmits a query to a database management system which controls the table, including a value from the data source. A result set is received from the table, is cached, and additionally is stored for purposes of responding to the query. Thereafter, if a value from the data source is retrieved which is identical to a previously retrieved data source value, the cached corresponding result set is utilized, in lieu of transmitting a further query to the table.

12 Claims, 3 Drawing Sheets

O_Manager

| empNum | empName | Dept |
|--------|---------|------|
| 103 | TOM | SPORTS |
| 101 | JACK | RESEARCH |
| 101 | JACK | HEALTH |
| 102 | JEAN | DEVELOPMENT |
| 102 | JEAN | LEGAL |

S_Salary

| empNum | Salary |
|--------|--------|
| 101 | 100000.00 |
| 103 | 50000.00 |

METHOD AND APPARATUS FOR CACHING RESULT SETS FROM QUERIES TO A REMOTE DATABASE IN A HETEROGENEOUS DATABASE SYSTEM

CROSS-REFERENCE TO RELATED PATENT APPLICATIONS

This Application is related to the following co-pending patent applications:

"HETEROGENEOUS DATABASE SYSTEM WITH DATA SOURCE EXTENSIBILITY", Inventor(s): Kleewein et al., U.S. Ser. No. 08/929,809;

"SYSTEM AND METHOD FOR PROVIDING A SINGLE APPLICATION PROGRAM INTERFACE FOR HETEROGENEOUS DATABASES", Inventor(s): Kleewein et al., U.S. Ser. No. 08/931,008;

"METHOD AN APPARATUS FOR OPTIMIZING QUERIES ACROSS HETEROGENEOUS DATA BASES", Inventor(s): Kleewein et al., U.S. Ser. No. 08/929,877;

"METHOD AND APPARATUS FOR OPTIMIZING A MERGE-JOIN OPERATION ACROSS HETEROGENEOUS DATABASES", Inventor(s): Kleewein et al., U.S. Ser. No. 08/931,404;

"METHOD AND APPARATUS FOR DEFERRING LARGE OBJECT RETRIEVALS FROM A REMOTE DATABASE IN A HETEROGENEOUS DATABASE SYSTEM", Inventor(s): Kleewein et al., U.S. Ser. No. 08/929,642;

"HETEROGENEOUS DATABASE SYSTEM WITH DYNAMIC COMMIT PROCEDURE CONTROL", Inventor(s): Kleewein et al., U.S. Ser. No. 08/931,029; and "METHOD AND APPARATUS FOR ACCESSING OF LARGE OBJECT DATA SEGMENTS FROM A REMOTE DATABASE", Inventor(s): Maheshwari et al., U.S. Ser. No. 08/931,002.

FIELD OF THE INVENTION

This invention relates to an application program interface which provides transparent access to heterogeneous databases and, more particularly, to such an interface which provides an improved efficiency data manipulation action between locally stored data and data from a remote database.

BACKGROUND OF THE INVENTION

A continuing demand exists to couple multiple databases so as to enable transparent access to data stored therein. "Transparent" implies that an application program at a specific site is able to access data from all connected databases, without being aware of the origin of the data, nor of any incompatibilities which might exist between a local database and any of the plurality of coupled remote databases. It is to be understood that the terms "remote" and "local", as used herein, not only refer to physical locations, but also to databases that are located at a single site (e.g., on one or more computers), but are controlled by different operating systems or database protocols.

In order to provide a transparent interface for heterogeneous databases, the prior art has employed one database as an interface and has enabled that interface, under control of a database management system (DBMS), to access data from other databases in accordance with data entries contained in an interface table.

Upon receiving a query, the receiving DBMS performs a query optimization procedure to decide upon an efficient method for accessing the requested data. During such a query optimization action, various types of join methods are often considered. A join method is used when rows from an "outer" table are concatenated to rows of one or more other tables (i.e., "inner" tables), in accord with a determined criteria. As used herein, the term table includes any tabular data listing. An outer table is one from which a search name is retrieved from a "joining column". An inner table is one from which data is retrieved, based on the search name retrieved from the joining column.

The joining column is the column in the outer table which includes the data or search names that are utilized when accessing data in the inner table. The data retrieved from the inner table, in answer to a received query, is termed the "result set".

Relational DBMS's use SQL (structured query language) as a standard language for enabling database manipulations. The SQL language allows users to formulate relational operations on the database tables. For example, each SQL operator operates on either one or more tables and produces a new table as a result. SQL enables the linking together of information from multiple tables or views to perform complex sets of procedures, through a single statement. One of those procedures is a join of columns of data from two or more tables.

Performing of join operations can be quite costly in terms of performance because each row in a first table must be joined with multiple rows in a second table. In a heterogenous database system, a complex join operation can result in heavy communication costs, especially where one of the databases is remotely located.

DBMS query optimization procedures have, in the prior art, attempted various techniques for improving processing efficiency when responding to queries. U.S. Pat. No. 5,548,758 to Pirahesh et al., assigned to the same Assignee as this application, optimize a certain SQL query type in a relational DBMS through the use of early-out join transformations. An early-out join comprises a many-to-one join, wherein the join action scans an inner table for a match for each row of an outer table and terminates the scan for each row of the outer table when a single match is found in the inner table. Procedures are described for the transformation of a many-to-many join to an early-out join in the '758 patent.

The prior art also includes a number of teachings regarding optimization of query plans in heterogenous database systems. For instance, Hsu et al. in "Reformulating Query Plans for Multi-Database Systems", Second International Conference on Information and Knowledge Management, Nov. 1–5, 1993, pages 423–432 describe a query optimization technique that is particularly directed to heterogenous database systems. A query plan is reformulated, using database abstractions and knowledge about the contents of the databases, to arrive at a query plan that is less expensive but semantically equivalent. The object of the reformulation algorithm presented by Hsu et al. is to reduce the cost of data retrieval in response to a received query. Hsu et al. do not generate queries each time a controlling rule is executed. Instead, all applicable rules are executed at once and candidate constraints are collected into a list set. Thereafter, only appropriate constraints are selected that will contribute to the cost reduction. More precisely, the Hsu et al. approach is a "delayed-commitment strategy" because the system delays the reformulation of the query until it has enough information to make a decision.

A further suggestion regarding query optimization is presented by Arens et al. in "Intelligent Caching: Selecting, Representing and Reusing Data in an Information Server", Third International Conference on Information and Knowledge Management, Nov. 29–Dec. 2, 1994, pages 433–438. Arens et al. set out certain rules which are to be followed when determining what data to cache in a multiple heterogeneous and distributed database network. Arens et al. suggest that data retrieved in response to a user's query may be cached for future reuse and various broadly stated rationales are provided to assist in determining when the caching should occur.

It is an object of this invention to provide a method and apparatus for improving the efficiency of handling of queries to remote database tables through caching.

It is another object of this invention to provide a system and method for improving the efficiency of remote query operations in a heterogenous system.

SUMMARY OF THE INVENTION

A method enables a data manipulation action to occur between data from a data source and data in a table in a database, where the database is remote from the data source. The method includes the steps of: determining whether data from the data source comprises unique values, and if not, enabling a caching procedure. The caching procedure obtains values from the data source and transmits a query to a database management system which controls the table, including a value from the data source. A result set is received from the table, is cached, and additionally is stored for purposes of responding to the query. Thereafter, if a value from the data source is retrieved which is identical to a previously retrieved data source value, the cached corresponding result set is utilized, in lieu of transmitting a further query to the table.

BRIEF DESCRIPTION OF THE DRAWINGS

FIGS. 3–4 illustrate an inner table and an outer table and are utilized as examples in describing the operation of the invention.

DETAILED DESCRIPTION OF THE INVENTION

Figure 1:
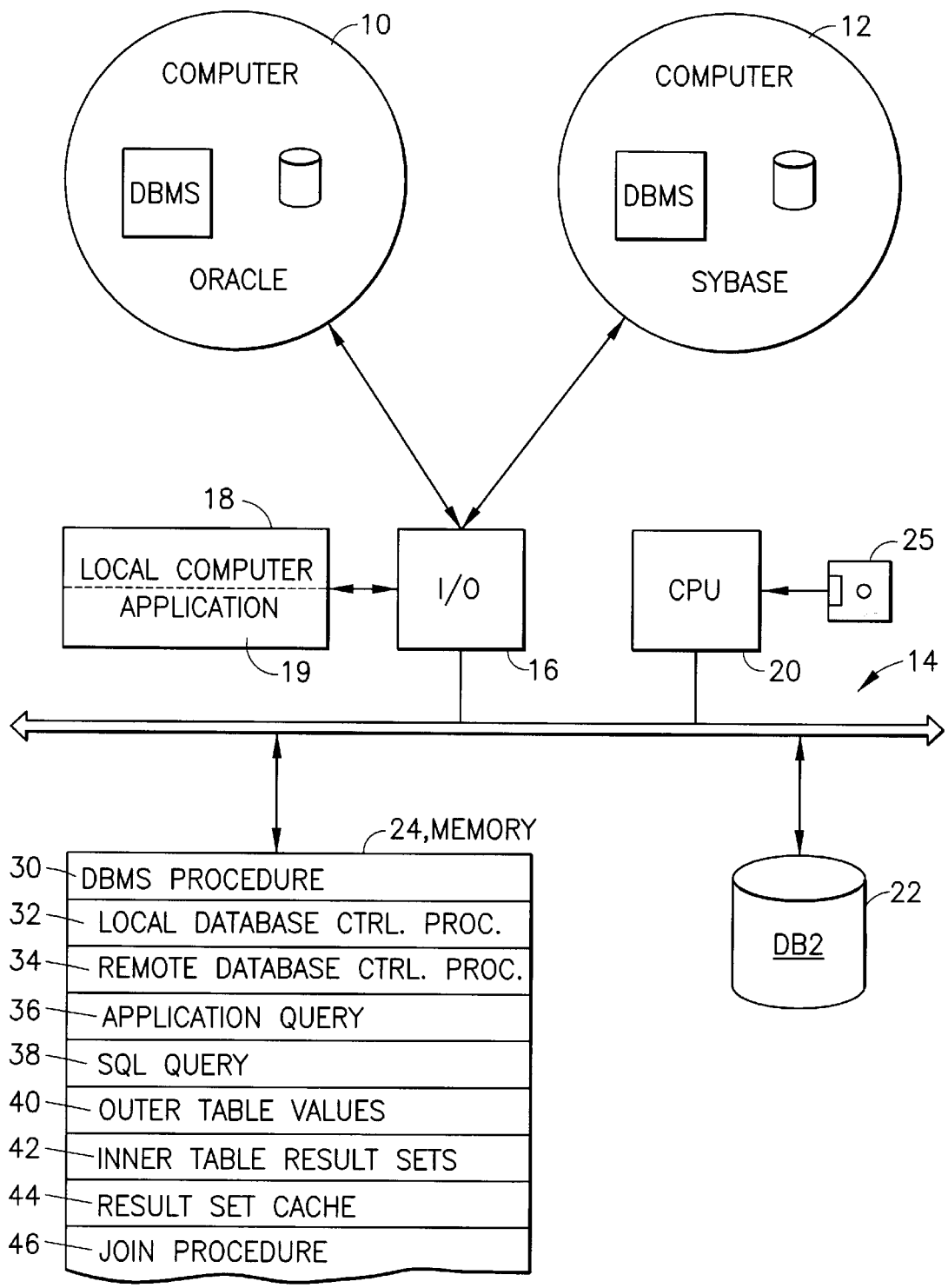
FIG. 1 is a high level block diagram of a database system which incorporates the invention.

Referring to FIG. 1, a heterogeneous database system includes, for example, three separate database management systems (DBMS's). A computer 10 includes an Oracle DBMS, a computer 12 includes a Sybase DBMS, and a computer/server 14 includes a DB2 DBMS. (Oracle is a trademark of the Oracle Corporation, Sybase is a trademark of the Sybase Corporation, IBM and DB2 are trademarks of the International Business Machines Corporation). Computer/server 14 includes an input/output (I/O) module 16 which enables communication with computers 10 and 12 and various local computers 18, etc.

As will be hereafter understood, an application program 19 running on local computer 18 is able to access data from any connected database, whether the data is housed in computers 10, 12 or 14, and at all times it appears to application program 19 as though the data is coming from computer/server 14. A central processing unit (CPU) 20, a disk file 22 where the data comprising the DB2 database is stored and a memory 24 are all contained within computer/server 14. Within memory 24 are a plurality of procedures which provide overall control of the DB2 database and enable transparent access to and from the Oracle and Sybase databases in computers 10 and 12. Each of the aforesaid databases can be accessed by a standard data access language, such as SQL.

While the procedures to be considered below which enable implementation of the invention are shown in FIG. 1 as already loaded into memory 24, it is to be understood those procedures can be loaded into CPU 20 via a memory disk, tape or other storage device 25 in the well known manner. In any of these cases, the operation of CPU 20, in carrying out the functions of the invention, are controlled by the procedures and data stored in either memory 24 or storage device 25.

Memory 24 schematically illustrates some of the entries stored therein. DBMS procedure 30 includes local database control procedure 32 and remote database control procedure 34. Local database control procedure 32 is, for instance, responsive to a request from application program 19 running on local computer 18, to retrieve requested data from the DB2 database stored on disk file 22. Remote database control procedure 34 performs the same function, but with respect to the Oracle and Sybase databases contained on computers 10 and 12, respectively. In all cases, the functioning of procedures 32 and 34 are transparent to application program 19.

Memory 24 further includes a number of sub-procedures which are utilized to carry out the invention. In specific, remote database control procedure (hereafter RDCP) 34 stores an application query 36 received from application program 19. RDCP 34 further responds to receipt of application query 36 by establishing an SQL query 38 to a remote database wherein data is stored which is required to respond to application query 36. SQL query 38 is of the type which manifests a bind-in value so that the same SQL query 38 is issued for each entry from an outer table. However, the bind-in value is altered with each new dispatch of SQL query 38 to evidence the new outer table value.

A further section of memory 24 includes outer table values 40 which are retrieved from either a locally stored outer table or from a remotely stored outer table, such as one stored in computer 10 (Oracle database). Memory 24 further includes a region for storing inner table result sets 42 that are returned in response to each SQL query 38. Finally, a result set cache 44 is positioned in memory 24 and stores result sets that are thereafter used to forestall issuances of subsequent SQL queries when an outer table bind-in value is detected which is identical to one previously dispatched and for which a result set has been received.

To illustrate the invention, a join data manipulation between data stored in inner and outer tables will be presented hereafter. Thus, while the invention will be described in the context of data from two tables, it is to be understood that the invention is equally applicable when any data source is encountered with duplicate values and such values are used to retrieve data from a remote table It is therefore to be realized that the invention is equally useful with other data manipulation actions that are performed in database operations.

It often occurs that an SQL query will require a single value from an outer table to be joined with multiple rows of an inner table. For instance, assume that a query is received from application program 19 which requests identification of all department managers in an organization having salaries of $50,000 or greater. (It is possible that one employee manages multiple departments.) If the unique identifiers (e.g., employee numbers) of all department managers are stored in one database (see table O_Manager in FIG. 3) and the salaries of all employees in the organization are stored a table in still another database (see table S_Salary in FIG. 4), a join action must be performed to respond to the query. Assume that table O_Manager is the outer table and that table S_Salary is the inner table. If a join procedure is performed which blindly proceeds through all manager entries in the outer table, thus causing SQL queries to be generated for each of the aforesaid entries, duplicate SQL queries are created when a manager's employee number is reached who already has been considered (e.g., because the manager manages another department).

By caching the inner table result set for each respective manager social security number, and determining whether an SQL query, including the particular social security number for which a result set is already cached, has already been dispatched, the result set present in the result set cache 44 can be utilized and the necessity for an SQL query eliminated.

Figure 2:
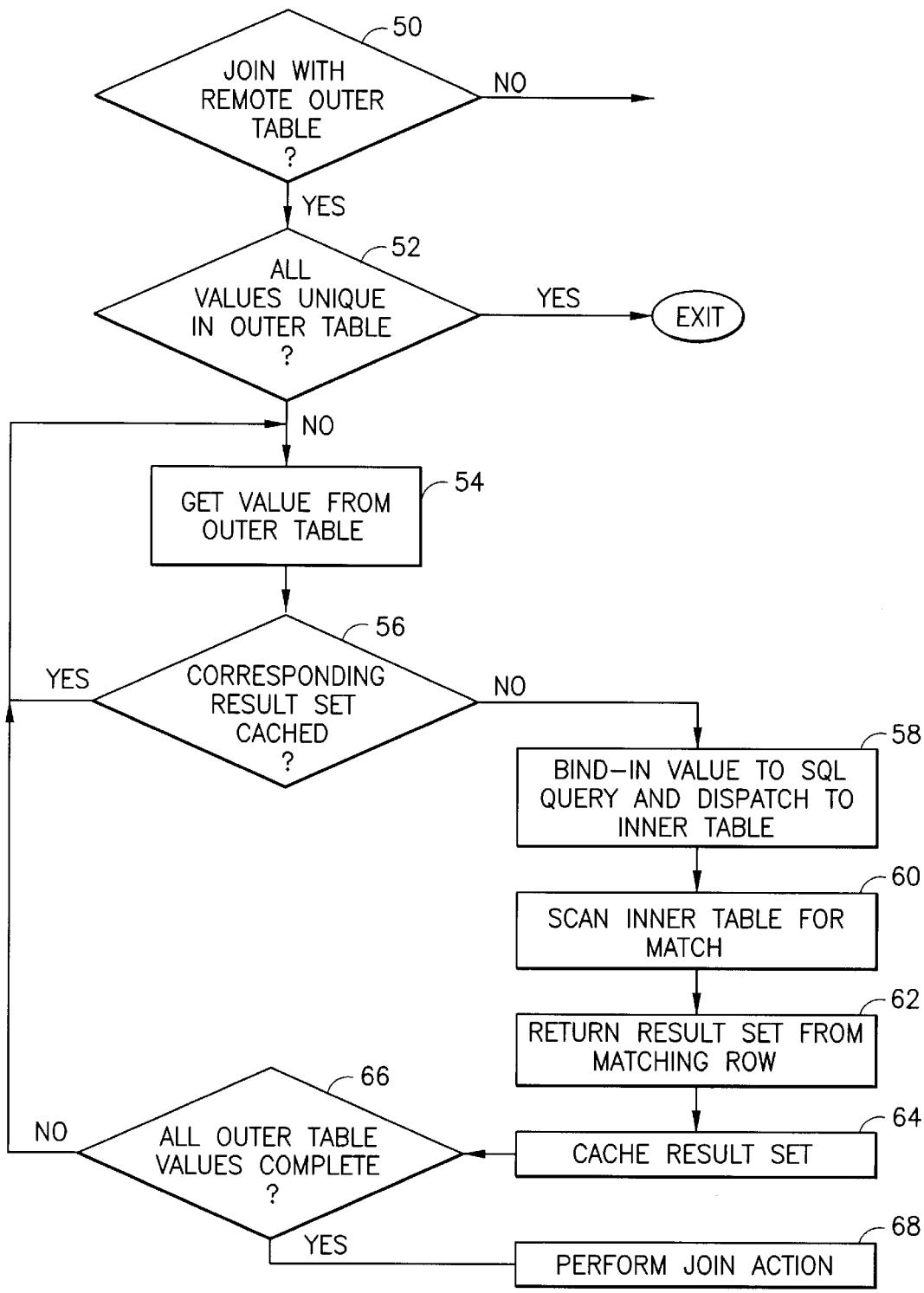
FIG. 2 is a logical flow diagram which illustrates the operation of the method of the invention.

Hereafter, the logical flow diagram of FIG. 2 will be considered, followed by a specific example of the invention, as applied to the outer and inner tables shown in FIGS. 3 and 4, respectively. It is to be initially understood that the invention is principally utilized when the inner table is remotely located (requiring expenditure of communication costs each time an SQL query 38 is dispatched from the processor wherein RDCP 34 is running). When the outer table is remotely located, the provision of (i) result set cache 44 and (ii) a subprocedure within RDCP 34 to determine the presence of a result set which corresponds to an outer table value, can result in substantial communication savings.

Turning now to a consideration of the flow diagram of FIG. 2, in combination with FIG. 1, when DBMS procedure 30 (which runs on computer/server 14) receives an application query 36, it determines whether the query requires action of RDCP 34. Assume that the query does require action of RDCP 34; that access to outer table 47 is required to respond to the query; that outer table 47 is remotely located on computer 10 (Oracle database); and that an inner table 49 is remotely located on computer 12 (Sybase database). Further, assume that application query 36 requires, for example, a join action between data from outer table 47 and data from inner table 49 (decision box 50).

At this stage, RDCP 34 is invoked by DBMS 30 and determines that both the Oracle and Sybase databases will be involved in providing a response to application query 36. Accordingly, RDCP 34, communicates with computer 10 and accesses statistical information regarding the Oracle database and outer table 47 from which data is required to respond to the query. Such statistical information indicates, for example, how large is the table, the number of columns in the table, the number of rows in the table and the number of unique values in each column.

Given the number of rows and the number of unique values in a column, it is next determined whether there are duplicate entries in a column. If a sufficient number of duplicate entries exist in the column (e.g., exceeding a pre-established threshold), a decision is made to invoke the result set caching action of RDCP 34.

As shown in FIG. 2, decision box 52 determines whether all values are unique in the column to be joined from outer table 47 (decision box 52). If all values are unique, the procedure exits as reason to cache result set data. Such a circumstance may exist if all employee social security numbers in the column are unique.

Assuming that there are sufficient duplicate values in the column of outer table 47, the procedure moves to box 54 wherein an initial value is accessed from outer table 47 and is imported into processor/server 14. It is then determined (decision box 56) whether a corresponding result set from inner table 49 has been cached in result set cache 44 which corresponds to the imported outer table value. If yes, a next value is retrieved from outer table 47, as no query needs to be dispatched, due to the presence in result set cache 44 of the corresponding data from inner table 49. Accordingly, the procedure recycles back to table 54, where a next value is retrieved from outer table 47.

If, by contrast, there is no corresponding result set in result set cache 44, the value from outer table 47 is bound-in to SQL query 38 and the query is dispatched to inner table 49 (box 58). There, inner table 49 is scanned for a match with the value from outer table 47 (box 60) and, assuming a match is found, selected data from the row wherein the matching value is identified is returned as a result set (box 62). The returned result set is cached (box 64) in result set cache 44 and is further stored in inner table result sets region 42 in memory 24.

Next, it is determined if all values from outer table 47 have been examined (decision box 66) and if no, the procedure recycles to box 54 and continues. If yes, join procedure 46 is invoked and each of the values from outer table 47 is then joined with the retrieved result sets from inner table result sets region 42 in memory 24 (box 68).

As can now be understood, for each duplicated outer table value for which a result set has been cached in result set cache 44, a duplicate entry for inner table result sets 42 region of memory 24 can be obtained without the need for a dispatch of an SQL query to inner table 49. Accordingly, significant communication costs can be achieved through the use of the invention.

Hereafter, an example will be provided which further describes the operation of the invention. Assume now that application program 19 dispatches the following query to DBMS procedure 30:

"Select X.emp Name, X.Dept, Y.Salary from O_Manager X, S_Salary Y where X.empNum=Y.empNum"

Assume further that O_Manager is a remote outer table 47 on Oracle database in computer 10 and S_salary is remote inner table 48 on Sybase database on computer 12. Assume further that an optimizer function within DBMS procedure 30 decides to use a remote nested loop join to join these two remote tables.

FIG. 3 illustrates the contents of O_Manager table 47 and further indicates that "Jack" manages both the research and the health departments; and that "Jean" manages both the development and legal departments. S_salary inner table 49 (FIG. 4) illustrates that employee 101 has a salary of $100,000 and employee 103 has a salary of $50,000.

To respond to the query from application program 19, DBMS procedure 30 invokes RDCP 34 which, in turn, performs a remote nested loop join by taking a joining column (empNum) from O_manager table 47 (FIG. 3) and binds it into a <host variable> placeholder in an SQL query statement that is to be dispatched to S_Salary inner table 49. The SQL statement reads as follows:

Select Salary from S_Salary where empNum=<host variable>

The above SQL query statement is sent to S_Salary inner table 49. Thus, for empNum value 103 from O_Manager outer table 49 (FIG. 3), the result set returned from the S_Salary inner table 49 is $50,000, which result set is stored in both inner table result sets region 42 and result set cache 44.

The next SQL query issued to S_Salary inner table 49 includes empNum 101 from O_Manager outer table 47. In response, the S_Salary inner table 49 returns a result set of $100,000 to RDCP 34 which stores the result set in both inner table result sets region 42 and result set cache 44. When the next empNum value (i.e., 101) from O_Manager outer table 47 is received, it is determined that a result set has already been received for empNum 101. Accordingly, no SQL statement needs to be issued and the procedure moves to the next outer table value.

It should be understood that the foregoing description is only illustrative of the invention. Various alternatives and modifications can be devised by those skilled in the art without departing from the invention. For instance, if the amount of data in result set cache exceeds a capacity limit, the caching procedure can be discontinued. Accordingly, the present invention is intended to embrace all such alternatives, modifications and variances which fall within the scope of the appended claims.

We claim:

1. A method for enabling a data manipulation action between data from a data source and data from a table at a remote location, said method comprising the steps of:

a) determining whether data to be manipulated from said data source includes a number of duplicate values, wherein said number exceeds a threshold value;

b) if said number exceeds said threshold value, invoking a caching procedure at said remote location of said table;

c) obtaining a value to be manipulated from the data source and transmitting a query to a data base management system (DBMS) which controls the table that includes said value to be manipulated from the data source;

d) receiving a result set from said DBMS in response to said query;

e) executing said caching procedure to cache said result set; and f) repeating steps c)–e) for each next value to be manipulated from the data source unless it is determined that said next value to be manipulated from said data source is a duplicate of a previous value obtained from said data source, in which case, inhibiting transmission of a query for said next value to be manipulated.

2. The method as recited in claim 1, comprising the further step of:

g) performing a manipulation of each value from said data source with a result set received in response to a query which included said each value, and if a query transmission was inhibited in accord with step f), employing a cached result set that corresponds to said value to be manipulated.

3. The method as recited in claim 1, comprising the further step of:

g) revoking said caching procedure of step b) if a quantity of data in cached result sets exceeds a capacity value.

4. The method as recited in claim 1, wherein step c), if said data source is remotely stored from a processor performing the method, enables access of individual values to be manipulated from said table, without importation of said entire data source.

5. The method as recited in claim 1, wherein said data source and table are controlled by heterogeneous database management systems and wherein a processor, incorporating a database local thereto, performs steps a)–f), said processor performing the added step of;

presenting results of said manipulation action to a user processor as though data from said data source and table used in said data manipulation action had come from said database local to said processor, whether or not said data came therefrom or not.

6. The method as recited in claim 1, wherein said data manipulation action is a join procedure.

7. A memory media for controlling a processor to perform a data manipulation action on data from a data source and data from a table at a remote location, said memory media comprising:

a) means for controlling said processor to determine whether data to be manipulated from said data source includes a number of duplicate entries, wherein said number exceeds a threshold value;

b) means for controlling said processor to enable a caching procedure invoked at said remote location of said table if said number exceeds said threshold value;

c) means for controlling said processor to obtain a value to be manipulated from the data source and to transmit a query to a database management system (DBMS) which controls the table that includes said value to be manipulated from the data source;

d) means for controlling said processor to receive a result set from said DBMS in response to said query;

e) means for controlling said processor to execute said caching procedure to cache said result set; and f) means for controlling said processor to repeat steps c)–e) for each next value to be manipulated from the data source, unless it is determined that said next value to be manipulated from said data source is a duplicate of a previous value obtained from said data source, in which case, controlling said processor to inhibit transmission of a query for said next value to be manipulated.

8. The memory media as recited in claim 7, further comprising:

g) means for controlling said processor to manipulate each value to be manipulated from said data source with a result set received in response to a query which included said each value, and if a query transmission was inhibited by means f), controlling said processor to employ a cached result set that corresponds to said value to be manipulated.

9. The memory media as recited in claim 7, further comprising:

g) means for controlling said processor to revoke said enabling of said caching procedure by means b) if a quantity of data in cached result sets exceeds a capacity value.

10. The memory media as recited in claim 7, wherein means c), if said data source is remotely stored from said processor, enables access of values to be manipulated from said table, without importation of said entire data source to said processor.

11. The memory media as recited in claim 7, wherein said data source and table are controlled by heterogeneous database management systems and wherein said processor incorporates a database local thereto, said memory media further comprising:

means for controlling said processor to present results of said data manipulation action to a user processor as though data from said data source and table used in said data manipulation action had come from said database local to said processor, whether or not said data came therefrom or not.

12. The memory media as recited in claim 8, wherein said means g) controls said processor to perform a join action as said data manipulation.

* * * * *